United States Patent [19]
Holdeman

[11] Patent Number: 5,217,609
[45] Date of Patent: Jun. 8, 1993

[54] COMBINATION SLUDGE COLLECTOR, AERATOR, AND RETURN PUMP

[76] Inventor: Robert K. Holdeman, 1208 Fairway Dr., Ashland, Ohio 44805

[21] Appl. No.: 836,603

[22] Filed: Feb. 18, 1992

[51] Int. Cl.$^5$ .................... B01D 21/24; C02F 9/00; C02F 11/00
[52] U.S. Cl. .................... 210/207; 210/220; 210/532.1; 210/195.3; 210/197
[58] Field of Search .......... 210/532.1, 534, 535, 210/220, 221.2, 320, 202, 205, 207, 195.3, 197, 803, 206

[56] References Cited

U.S. PATENT DOCUMENTS

| 2,732,944 | 1/1956 | Hays | 210/534 |
| 2,883,060 | 4/1959 | Griffith | 210/532.1 |
| 3,537,583 | 11/1970 | Wahner | 210/532.1 |
| 3,975,276 | 8/1976 | Schmid | 210/525 |
| 4,008,159 | 2/1977 | Besik | 210/206 |
| 4,033,875 | 7/1977 | Besik | 210/197 |
| 4,670,142 | 6/1987 | Lowry | 210/532.1 |
| 4,966,705 | 10/1990 | Jamieson | 210/195.3 |
| 5,035,795 | 7/1991 | Schmid | 210/534 |

FOREIGN PATENT DOCUMENTS

| 494294 | 3/1930 | Fed. Rep. of Germany | 210/220 |
| 2184398 | 7/1990 | Japan | 210/220 |

Primary Examiner—Thomas M. Lithgow

[57] ABSTRACT

The clarifier in any activated sludge sewage treatment plant must provide (a) a quiescent environment to allow gravity settling of the bio-mass (sludge) grown within the aeration tank, (b) the decanting of clear supernatant thus produced, and (c) the timely removal of all accumulated clarifier sludge. This invention improves prior clarifier performance by (a) providing vacuum assistance to gravity settling, (b) trapping all sedimentation within an aerated sludge containment zone, (c) providing clarifier sludge aeration to prevent denitrification, (d) utilization of spent aeration air for energy-free return sludge pumping, (e) the elimination of density currents and induced currents created by return sludge pumping, and (f) providing uniform hydraulic sludge collection eliminating the need for mechanical collection. The lower portion of the clarifier walls must be inward sloped to provide a hopper bottom. This invention then provides prefabricated hood(s), strategically placed over the hopper walls to form a sludge containment zone. The hood supports shall maintain continuous and adjustable spacing between the hood's lower edges and the hopper walls, forming access slots for sedimentation to enter the containment zone. The hopper sides shall continue their inward slope down and under the hood. The upper sides of the hood shall likewise be properly sloped to compliment the hopper slope. This invention invention shall provide aeration diffusers for uniform and consistent aeration without diffuser leveling and located below the hood, near the floor. Their size and placement are critical to (a) create a uniform vertically disposed rolling current to collect sedimentation below the protective hood and (b) insure entrapment of all entrained air and sedimentation. The aerators shall also provide free oxygen to negate potential clarifier sludge denitrification.

3 Claims, 3 Drawing Sheets

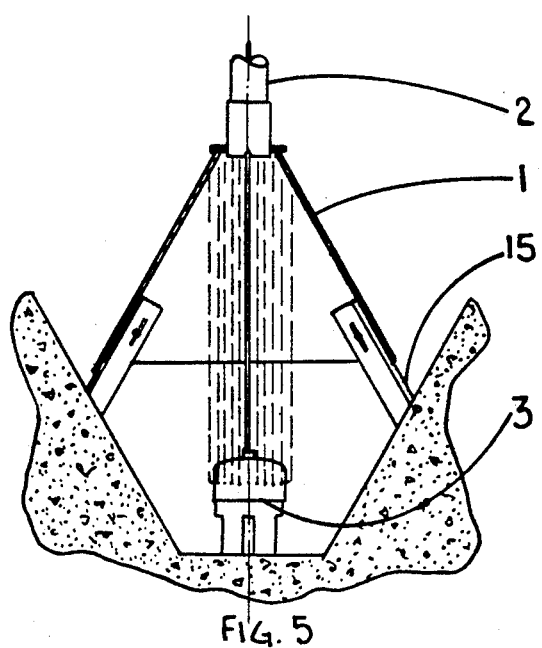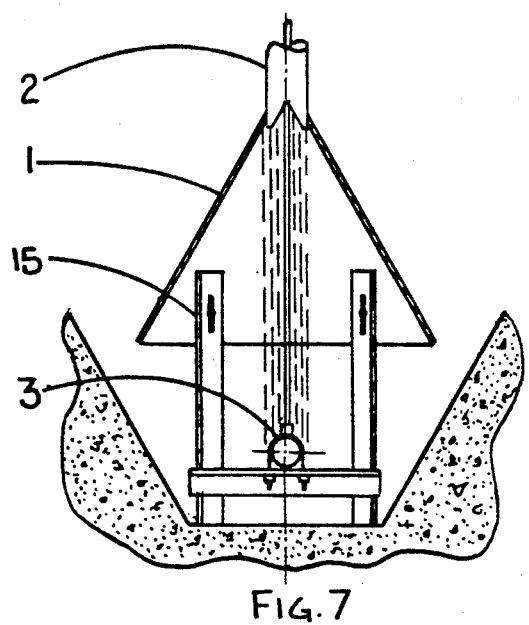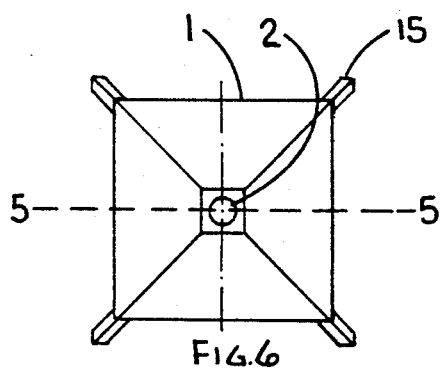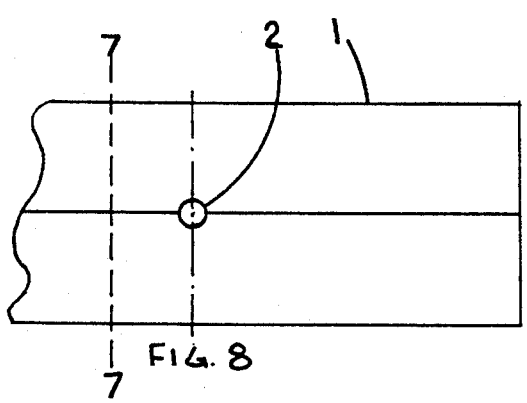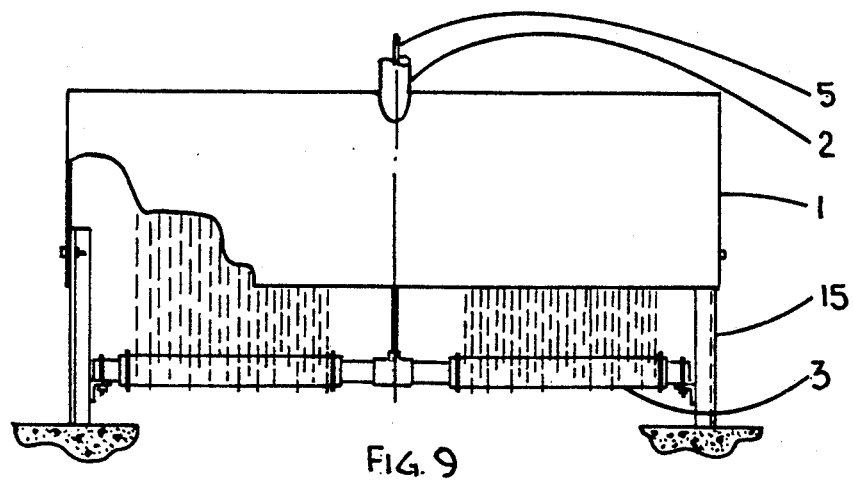

COMBINATION SLUDGE COLLECTOR, AERATOR, AND RETURN PUMP

SUMMARY OF THE INVENTION

The objective of this invention is to improve the performance of traditional clarifiers used in activated sludge sewage treatment plants (1) overcoming operational shortfalls through the elimination of clarifier denitrification, (2) reducing power consumption with relative energy-free return sludge collecting and pumping, (3) increasing sedimentation efficiency with vacuum assisted gravity settling and elimination of density currents and other induced longitudinal currents, and (4) simplifying operating, maintenance, and capital costs by eliminating all electro-mechanical collection and return sludge pumping requirements.

This invention will add a separate and protected sludge containment zone into the lower portion of the clarifier, while retaining its quiescent settling zone overhead. A prefabricated hood, sized and shaped to suit the hopper configuration, will define the containment zone, and be supported to maintain a uniform spacing between the hopper walls and the lower edges of the hood, thereby forming a continuous access slot from the upper to the lower zones. This invention will then add a clarifier diffused aeration system capable of uniform air distribution without leveling to overcome any usual aperture submergence differentials and utilizing a portion of the aeration air required by the plant's organic load, to create uniform rolling currents within the sludge containment zone. This redirected air will provide free oxygen to meet the continuing biological oxygen demand (B-O-D) of the activated sludge in residence, thereby maintaining its freshness, prevent septicity, and the potential for unwanted denitrification is negated. The hood will include airlift piping from the containment zone to exit the clarifier as required by the process. The airlift pump will be arranged to utilize the spent containment zone aeration air, thereby saving the additional energy required by prior clarifiers for sludge collection and return sludge pumping, thus providing an energy-free return sludge system. The removal of the return sludge reduces the hydraulic pressure within the sludge containment zone to create a suction head or partial vacuum uniformly distributed along the access slots at the base of the settling zone by the rolling currents, thereby improving sedimentation efficiency by adding vacuum assisted gravity settling. The aeration system uniformly draws all sedimentation without channelling into its containment zone, where it is rollerd up under the protective hood without electro-mechanical equipment, and there has access only to the return sludge pump. This invention will thus reduce the capital and operating costs of sewage treatment, while improving the quality of the water discharged into the environment.

DESCRIPTION OF THE DRAWINGS

FIG. 5 is a cross-sectional elevation of the hood as depicted in FIGS. 1 and 2.

FIG. 6 is a plan view of the hood as depicted in FIG. 5.

FIG. 7 is a cross-sectional elevation of the hood as depicted in FIGS. 3 and 4.

FIG. 8 is a plan view of the hood as depicted in FIG. 7.

FIG. 9 is a longitudinal elevation view of the apparatus of this invention illustrating an aternate placement of the aerators from those depicted in FIGS. 3 and 4.

BACKGROUND OF THIS INVENTION

1. Field of this Invention

Figure 1:
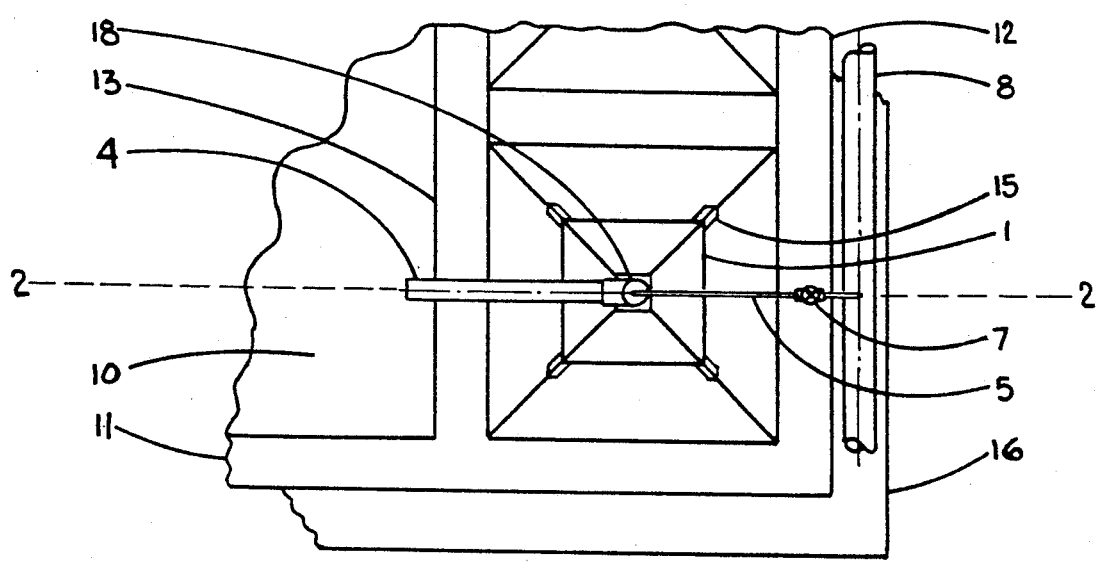
FIG. 1 is a plan view of a typical sewage treatment plant clarifier having an inverted pyramid shaped hopper bottom and illustrating the general shape and location of the apparatus of this invention.

A widely used method for treating wastewater containing organic pollutants is the activated sludge process and through the process can be operated intermittent batches, the preferred method is continuous operation. This will employ an aeration tank, where bacteria in an aerobic environment will grow to consume the organic pollutants, followed by a clarifier, where the agglomerated flocculent (sludge) from the aeration process is allowed to settle and produce a clear supernatant that can be decanted for ultimate discharge to the environment. The remaining sludge collects in the bottom of the clarifier where its timely removal, in a manner that will not disturb the overhead settling quiescence, is essential for successful operation.

Major operational problem in traditional clarifiers stem from the fact that the settled sludge has a continuing biological demand for oxygen (B-O-D) during its residence in the anoxic clarifier environment. With free oxygen unavailable, the bacteria in the older sludge, left too long in the clarifier, will turn to the bound oxygen of the sludge nitrates and consumes this oxygen, through nitrogen respiration or denitrification. This chemical process releases nitrogen bubbles, with some rising to the surface creating unwanted up-drafts, while the balance become entrained in the sludge blanket causing buoyancy that will pass floating sludge over the effluent weirs, to foul the receiving waters.

2. Description of Prior Art

The traditional method of clarifier sludge removal for small treatment plants is to provide the clarifiers with hopper bottoms and manually operated return sludge airlift pumps. There are two basic problems with this simplistic system, (1) it is easily and quite often mismanaged, and (2) in operation the pumps, taking suction near the bottom of the hoppers, draw channels through the sludge blanket to return freshly transferred aeration tank mixed liquor, leaving old sludge behind to denitrify.

The traditional method used for larger plants is to equip flat-buttomed clarifiers with mechanical scrapers that slowly plow the settled sludge into sumps outfitted with return sludge pumps. These clarifiers can be rectangular with chain driven scrapper flights or they may be circular with center driven scrappers. Alternatively, siphons can replace the flights, to be driven along the floor. All of these types of clarifiers are (1) equipment intensive, (2) require extra energy to operate, and (3) provide no assistance to gravity settling.

Other art has shown a triangular-shaped, closed vessel placed directly on the flat floor of a semi-hoppered clarifier. Depending on the length of the vessel, one or more equally spaced airlift barrels penetrate its apex and a plurality of intake apertures are equally spaced along the bases of the inclined sides. Air conduits traverse downward through each airlift barrel, terminating near the floor inside the vessel, and though they deliver air to operate the airlift pumps they do not create the uniform rolling currents unique to this invention. As a practical matter, the intake apertures must be of (1) sufficient size to preclude plugging and (2) in sufficient numbers to minimize blank spaces on either side. To fullfill both requirements, a great disparity between the collective areas of the apertures and their airlift barrels will result, and all of the pumped liquid will simply be drawn through just the few apertures centered near the airlifts.

DESCRIPTION OF THE PREFERRED EMBODIMENTS

Turning now to the drawings and FIGS. 1-4 in particular, two serial tanks forming parts of a sewage treatment plant are illustrated. In particular, a clarifier 9 and an aeration tank 10 are depicted. The tanks are formed with paralleling sidewalls 11, a partition wall 13, and its opposite sidewall 12 as illustrated. As a maximum, the partition wall 13, its opposing wall 12, and the paralleling sidewalls 11 will all have an inward sloping lower wall sections to form a truncated hopper in the bottom of the clarifier tank 9. As a minimum, the partition wall 13 and its opposing sidewall 12 shall have inward sloping lower wall sections to form a channel hopper in the bottom of the clarifier tank 9. The partition wall shall have one or more transfer conduits 14 as a means to transfer mixed liquor from the aeration tank 10 to the clarifier 9.

Figure 2:
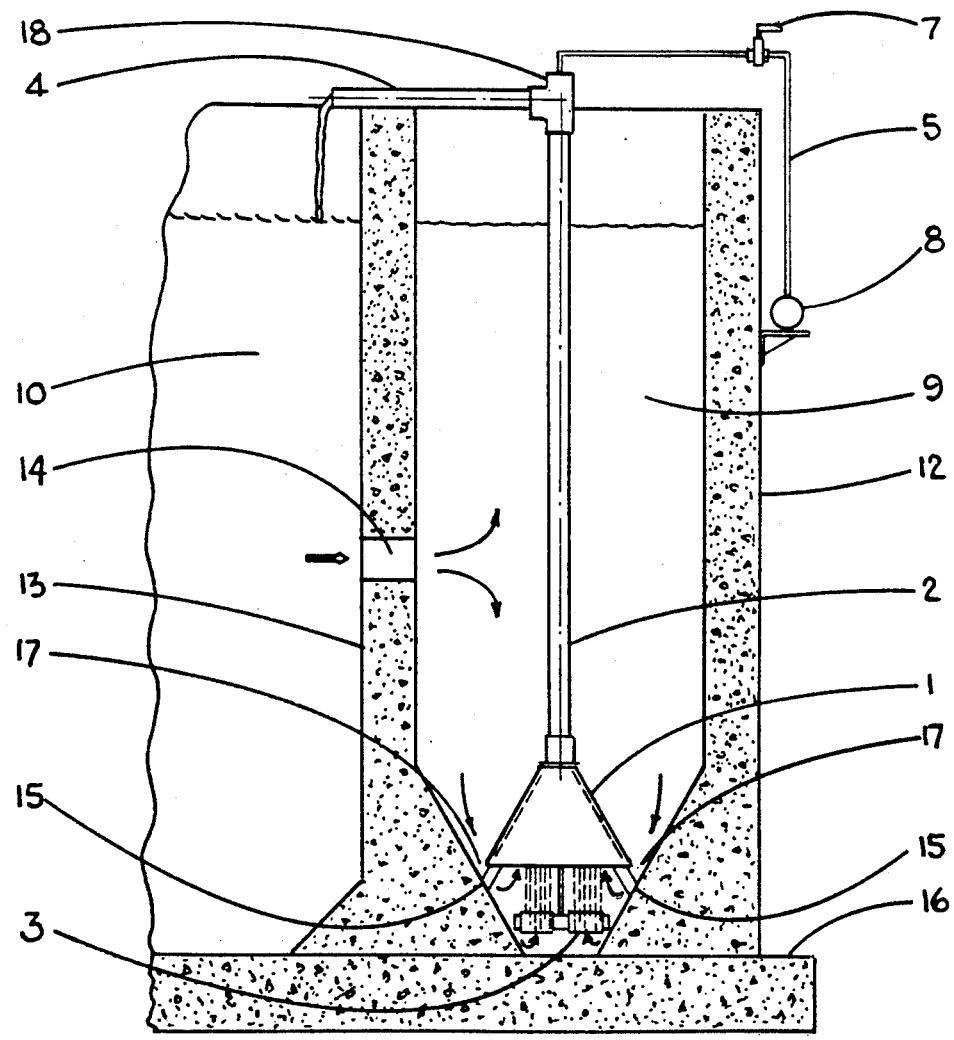
FIG. 2 is a cross-sectional elevation of the clarifier and apparatus of this invention as depicted in FIG. 1, again showing its general shape and location.
Figure 3:
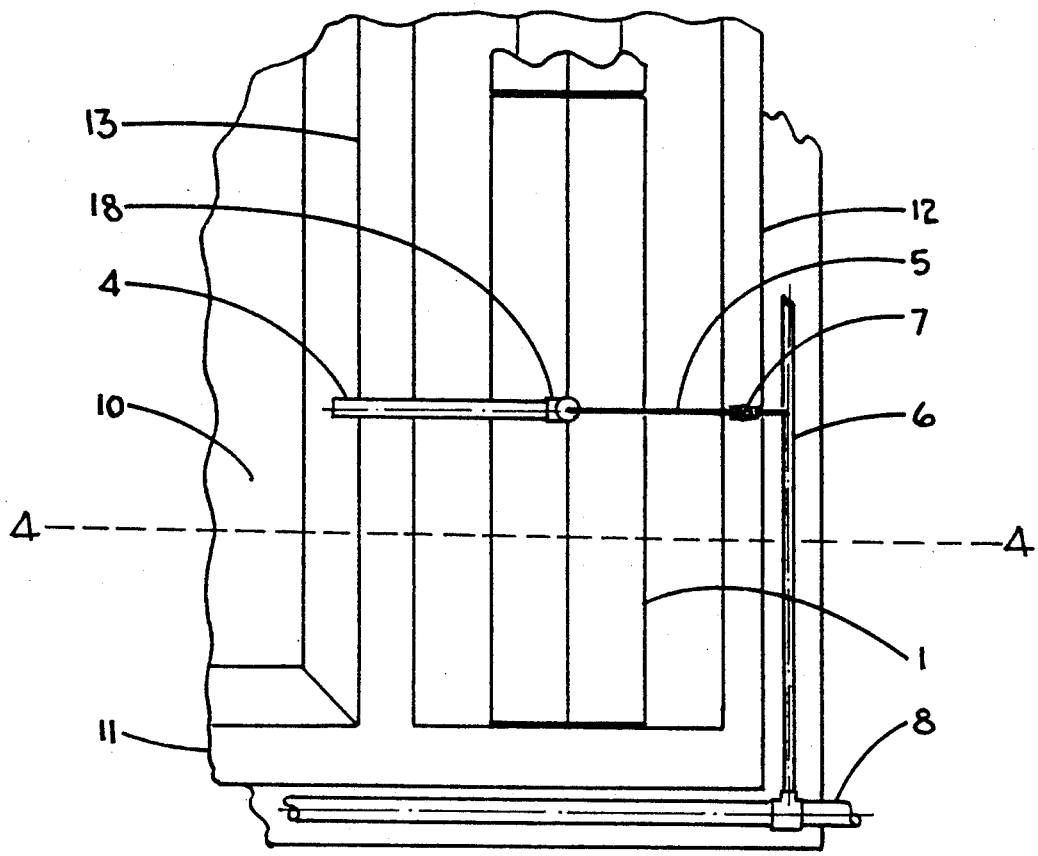
FIG. 3 is a plan view of a typical sewage treatment plant clarifier having a two-sided channel shaped hopper bottom and illustrating the general shape and placement of the apparatus of this invention.
Figure 4:
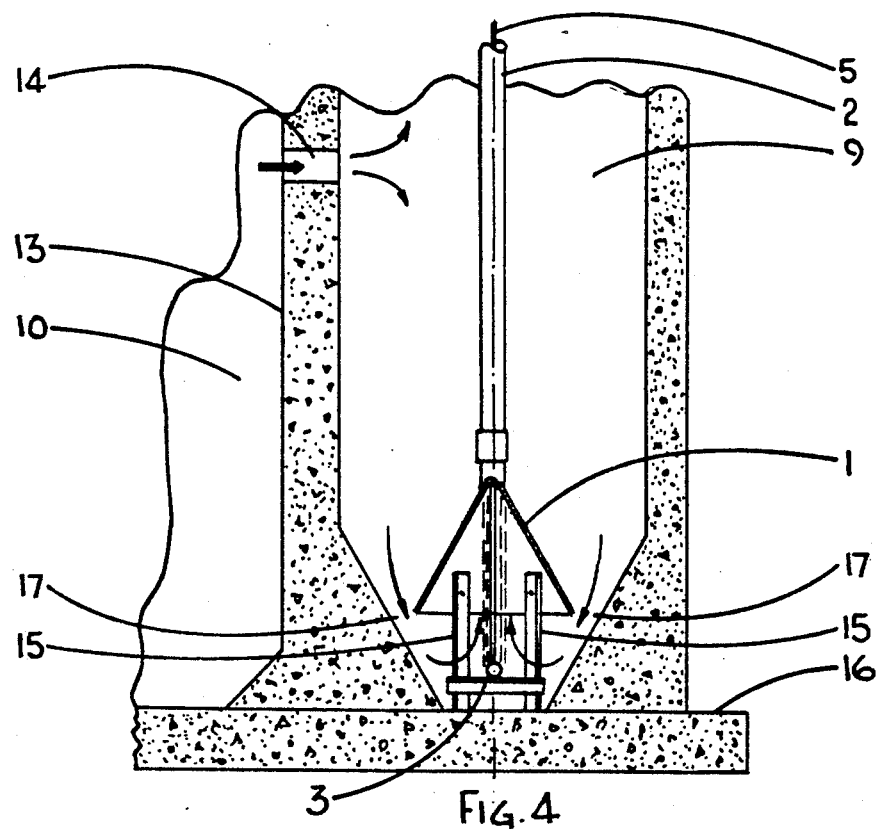
FIG. 4 is a cross-sectional elevation of the clarifier and apparatus of this invention as depicted in FIG. 3, again showing its general shape and location.

The apparatus of this invention will be installed within the clarifier 9 and in particular, the hood 1, the airlift riser pipe 2, and the aerator 3. The hood shall be provided with adjustable support legs 15 and in the case of the inverted pyramid hopper of FIGS. 1 and 2, the legs 15 will rest on the hopper portion of the sidewalls. In the case of the channel hopper of FIGS. 3 and 4, the legs 15 will rest on the clarifier floor 16. The lengths of the legs 15 shall be adjustable, such that for any installation, the lower perimeter of the hood 1 can be set to any desired dimension above the hopper walls, thus forming a uniform entrance slot 17, allowing the hopper walls to continue their downward slope commencing above and continuing to below the open plane of the bottom of the hood 1, as illustrated in FIGS. 2 and 4.

The lower end of the airlift riser pipe 2 shall penetrate the hood 1 and include a pipe fitting 18 located above the water level in the clarifier 9 to allow the field installation of an airlift discharge pipe 4 to be directed for gravity drainage to suit any particular installation.

An aerator 3 capable of uniformly distributing air along its entire length without leveling to overcome usual submergence differentials, shall be located below the apex of the hood 1 such that all discharged air will be collected up and under the hood 1. Compressed air, generally (though not obligatory to this invention) from the main aeration header 8 feeding the aeration system within the aeration tank 10, shall be supplied to the aerator 3 through an air feeder line 5. For the purposes of shut-off and throttling, the air feeder line 5 shall be furnished with a manual gate or ball valve 7. To complete this description, but in no way related to this invention, the clarifiers 9 will be equipped with a means to discharge the plant's effluent.

Turning now to FIGS. 5-8, two of the various shapes the hood 1 may take are illustrated. FIG. 5 is a cross-sectional elevation of a pyramidal shaped hood 1, showing its airlift 2 and its lower terminus notches that penetrate slightly below the apex of the hood 1, and its adjustable legs 15 resting on a portion of the hopper walls. FIG. 6 is a plan view showing the same embodiments of the pyramidal shaped hood 1. FIG. 7 is a lateral cross-sectional elevation of the hood made for the channel shaped hopper showing the hood 1, the airlift 2 with its lower terminus notches that penetrate slightly below the apex of the hood 1, and the adjustable legs 15 resting on the floor 16 of the hopper channel. FIG. 8 is a plan view showing the same embodiments of the channel type hopper installation.

FIG. 9 illustrates the aerator 3 installation directly below the apex of the hood 1 with its plumbing secured directly to the legs 15. The aerators 3 illustrated herein are commercially available, membrane-type, fine-bubble diffusers. To complete this illustration, the air feed line 5 and the airlift 2 are likewise shown. As an alternate method, the aerators 3 may be installed independent of the legs 15 and directly on the floor 16 as illustrated in FIGS. 2 and 5.

Further describing the apparatus and application of this invention, referring to FIGS. 2 & 4 a sludge collector hood 1 shall be installed within a hopper-bottomed clarifier 9. The lateral cross-section of the hood 1 shall be triangular. It shall have an open bottom and its upper sides shall be sloped to compliment the slopes of the clarifier 9. The placement of the hood 1 with respect to the hopper bottoms of the clarifier 9 is critical in that its hoppers must commence above and continue to below the lower edges of the hood 1. Further, the hood 1 shall be equipped with legs 15 to support the hood 1 above the clarifier 9 hoppers to form a uniform slot 17, such that settling and thickening sludge will not be unduly impeded in its downward movement from above the hood to its destination below the hood. The extension of the legs 15 below the hood 1 shall be adjustable to (a) allow the slot dimensions to be both adjustable and uniform in size and (b) allow the lower edges of the hood's perimeter to be leveled.

The aerator 3 shall be located such that all of the diffused air shall (a) rise up and be trapped under its hood 1 to insure the quiescence of the overhead settling zone, and (b) it is uniformly distributed to insure that all sedimentation is rolled up under the protective hood 1. The unique and multiple purposes of the aerator 3 are to (a) uniformly mix and lift the thickening sludge up and under the protective hood 1 where it will be turned downward under the outward sloping walls, thence striking the inward sloping lower wall sections of the clarifier tank below the entrance slots 17, where it will be turned inward towards the aerators 3 thus maintaining the rolling currents, all completely contained below the hood 1, (b) provide free oxygen to meet the biological oxygen demand (B-O-D) of the sludge trapped in the anoxic environment of the clarifier 9 to prevent denitrification, and (c) then feed into the airlift 2 causing the removal of the collected sludge. The air having thus fulfilled its primary function of meeting the plant's overall B-O-D, its secondary function, airlifting sludge from the clarifier 9, is accomplished without the use of additional energy.

Referring to FIGS. 4 & 9, because collected sedimentation beneath the hood is uniformly moved from near the floor 16 upwards under the protective hood 1, its subsequent removal by the airlift plumbing 2, will result in a reduced hydraulic head or pressure beneath the hood that will be uniformly manifested along the perimeter of the lower sidewalls of the hood 1, at the entrance slots 17. This reduced pressure or suction head will provide vacuum assistance to the clarifier's gravity settling. Further, the uniform application of this suction head along the entire length of the entrance slot 17 will seriously reduce, if not eliminate, the tendency of prior hopper bottom clarifiers to draw channels and thereby short-circuit freshly transferred mixed liquor from the transfer port 14. These same advantages shall likewise accrue to the pyramidal hopper 1 as illustrated in FIGS. 2 & 5. The action thus described is therefore not unlike the analogy to a vacuum cleaner that creates a reduced pressure or suction head that is uniformly manifested along its hood's intake slot.

In summary, the application of the apparatus of this invention will eliminate all operational problems of prior clarifiers relating to denitrification and floating sludge due to their inability to efficiently collect and pump sludge. Sedimentation will be enhanced through the vacuum assistance to gravity settling. Capital and operating expenses will be reduced through the elimination of electro-mechanical collection and pumping equipment and the ability of this invention to provide energy-free return sludge pumping. Therefore, due to its unique ability to improve the discharged water quality while reducing all associated costs, this invention will find wide application in both new plant construction and in the retro-fitting of existing clarifiers.

I claim:

1. An apparatus for collecting, aerating and pumping settled sludge from the bottom of an activated sludge clarifier comprising a hopper bottomed clarifier having an upper and bottom portion, said hopper having at least inwardly and downwardly sloping opposing sidewalls and either sloping or vertically closed opposing end walls, said walls meeting and thus defining a relatively small plan view floor area of either rectangular or square shape, said apparatus further comprising a collector hood located in the bottom portion of said clarifier and having opposing sidewalls which extend outwardly and downwardly from a common edge to their respective terminal edge generally in the form of an isosceles triangular cross section, said collector hood opposing walls defining an open bottom plane between its lower terminal edges, each of said collector hood opposing walls is located adjacent to, and extends the length of one of said hopper sloping sidewalls, each of said terminal edges being located in said hopper of the hopper bottomed clarifier such that a vertical line through each terminal edge will intersect its associated hopper sloping sidewall below said terminal edge and a horizontal line through each terminal edge will intersect its associated sidewall outside of said terminal edge, each of said terminal edges being spaced from said associated hopper sloped wall to define an access slot between each terminal edge and the associated hopper sloped wall, said hopper sloped walls commence above and outside said access slot and terminate below and inside said slot insuring that all sedimentation passing through said access slot will move inwardly and beneath the collector hood, said apparatus further including diffused aeration means located inside said hopper bottom and below said collector hood and positioned to provide consistent and uniform diffused aeration along the entire length of said collector hood, said apparatus further comprising at least one pipe means connected generally to the apex of said collector hood at said common edge and extending upwardly therefrom and out of the clarifier, said pipe means functioning as a sludge return airlift to move sludge from said hopper bottom out of said clarifier, whereby sludge that descends through one of said slots will move inwardly and downwardly to below the collector hood and then be caused to circulate upwardly due to the diffused aeration means and come into contact with the underside of the collector hood, some of said upwardly circulating sludge passing out through said pipe means and some being deflected downwardly and outwardly toward one of said slots, thereby creating a rolling current below said collector hood, said apparatus further comprising support means connecting said clarifier to said collector hood for supporting said collector hood in said clarifier, said support means comprises means for adjusting the collection hood relative to the clarifier to thereby adjust the size of said slot.

2. The apparatus of claim 1, wherein said at least one pipe means has at least one notch at the lower terminus thereof.

3. The apparatus of claim 1, wherein said diffusers are fine bubble membrane diffusers.

* * * * *